June 7, 1932.  M. C. HILL  1,861,919
CASTER CONSTRUCTION
Filed Sept. 18, 1929
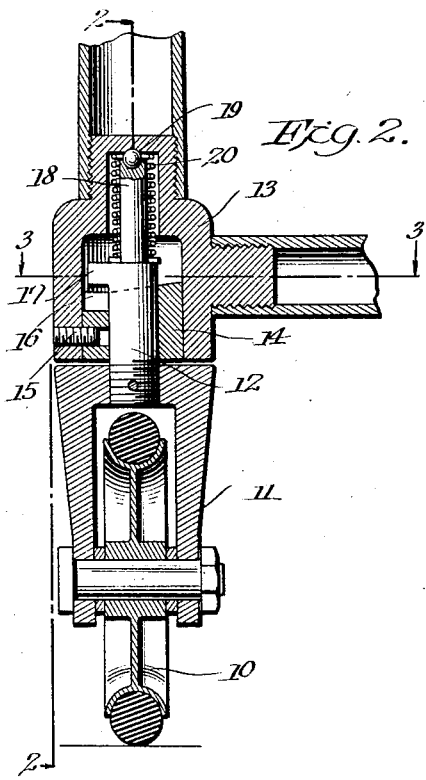
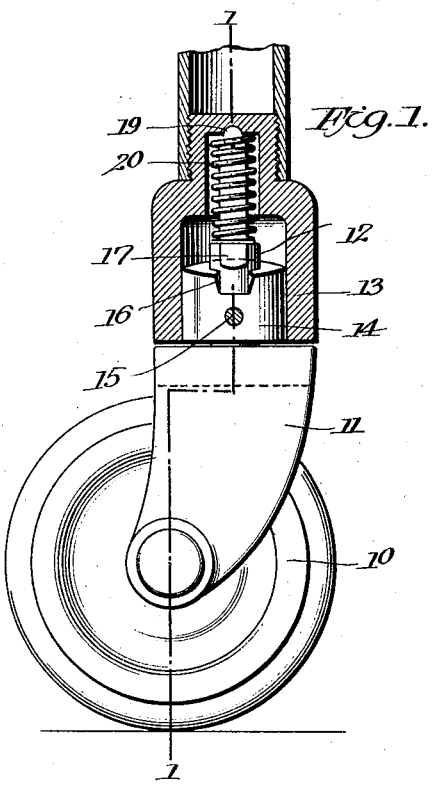
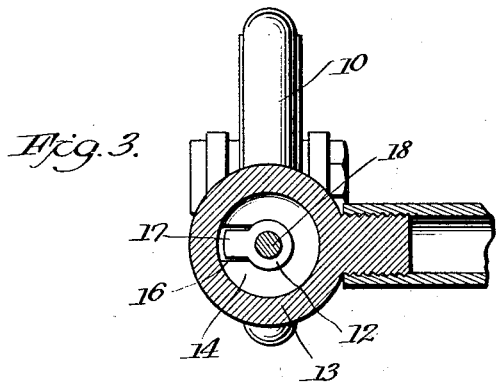
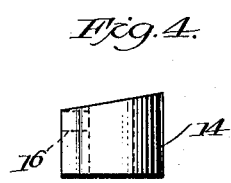
Inventor
Milton C. Hill
By Morrison, Kennedy & Campbell
Attorneys Patented June 7, 1932

1,861,919

UNITED STATES PATENT OFFICE

MILTON C. HILL, OF CHARLOTTESVILLE, VIRGINIA

CASTER CONSTRUCTION

Application filed September 18, 1929. Serial No. 393,482.

This invention relates to caster constructions.

The principal object of this invention is to provide means for locking a caster against swiveling in its socket, said means becoming operative when the weight normally supported by the caster is relieved.

This invention is particularly adapted for use in connection with wheeled ambulance cots, casket carriers and invalid chairs, which devices are ordinarily equipped with large rubber-tired swivel casters. When such a vehicle is raised from the ground to take it up or down stairs or in or out of an ambulance or railway car, the large casters tend to freely swivel on their spindles and thus cause considerable annoyance and inconvenience to the persons carrying the vehicle. It is therefore my present purpose to eliminate such objectionable movement of the casters by providing a locking mechanism which is inoperative when the vehicle is in use, but which will, when the same is raised from the ground, positively lock the casters against rotation about their vertical axes or spindles.

It is a further object of this invention to lock the casters in a predetermined position, preferably in the position wherein their direction of rotation will be parallel to the longitudinal axis of the vehicle.

In this connection, it is my still further purpose to provide means which will automatically insure operation of the locking means whatever the direction of rotation of the casters when the vehicle is lifted off the ground.

Other objects and advantages of the invention will in part be obvious and in part be more fully brought out as the description proceeds.

In the accompanying drawings, I have illustrated a practical embodiment of my invention; but it is to be understood that the drawings are illustrative merely and are not to be construed as limiting the invention to the details of construction therein disclosed.

It will be readily apparent to those skilled in the art that the invention is capable of a wide range of modification and equivalency, and that it is susceptible of utilization different from that herein set forth.

In these drawings:

Figure 1 is a view partly in section and partly in elevation, taken on the line 2—2 of Fig. 2, showing a swivel caster construction, a portion of the caster socket being cut away to give a side view of my locking device;

Figure 2 is a view in sectional elevation, taken on the line 1—1 of Fig. 1, showing the details of construction of my caster positioning and locking mechanism;

Figure 3 is a view of the caster construction, taken on the line 3—3 of Fig. 2, showing a top view of my locking mechanism; and Figure 4 is a view in plan elevation of a bushing constituting a part of the caster socket which serves as a positioning guide and locking seat, as well as freely supporting the caster spindle.

Referring, now, to the drawings, the reference-numeral 10 indicates a common form of caster supported in a yoke 11 which is rigidly secured to a spindle 12, the latter being rotatably mounted in a socket 13, as illustrated in Fig. 1.

My invention is best illustrated in Fig. 2, which shows the caster spindle 12 rotatably mounted in a bushing 14 which in turn is rigidly secured in the socket 13 by a pin or screw 15. This bushing, as also shown in Figs. 3 and 4, is provided with a recess 16 adjacent one end thereof, providing a seat for a locking key or pin 17 associated with the caster spindle 12.

As best shown in Fig. 4, the end of the bushing provided with the recess is cut at a perceptible angle to the diameter of the bushing to form a cam surface, at the lowest point of which is located the recess.

Referring to Fig. 2, I have shown an extension 18 on the spindle 12 the end of which is cupped to form a seat for a ball bearing 19 which insures free rotation of the spindle with respect to the end of the socket 13 when the weight of the vehicle rests on the caster. In connection with the spindle extension, I have provided a helical spring 20, one end of which seats against the end of the socket 13 and the other seating on the end of the main portion of the spindle. Thus, it will be evident that the spring, which will be sufficiently strong to force the spindle outwardly from the bushing when the vehicle equipped with my device is raised from the ground, will cause the locking pin 17 to ride around the cam surface on the bushing until the pin drops into the recess 16, and thus effectually locks the caster spindle against rotation. It will be seen that the cam surface will act as a guide for directing the locking pin into the recess whatever the position of the pin may be when the weight is removed from the caster. The tendency of the spring is to constantly urge the pin into the recess, and thus when the weight is lifted off the caster, the spring will press the pin against the cam surface and thus cause it to ride around that surface and into the recess.

When the vehicle is again lowered so that the casters are in contact with the ground, the locking pin will rise out of the recess, due to the downward pressure on the caster caused by the weight of the vehicle, and allow the spindle to freely rotate in the socket.

It may be desirable to have the locking mechanism inoperative only when a load is placed on the vehicle, in which case it is necessary to use a spring of sufficient strength to resist the downward pressure caused by the weight of the vehicle, per se, which tends to release the locking pin from the recess.

The position of bushing in the socket may be determined at will. I prefer to locate it so that when the pin on the caster spindle is locked in the recess in the bushing, the direction of rotation of the casters will accord with the usual direction of movement of the vehicle.

I claim:

1. A caster construction including a socket, a spindle rotatable therein, and automatically operative means associated with the socket for locking the spindle in a predetermined position.

2. A caster construction including a socket, a spindle rotatable therein, a caster carried by the spindle, and means operative when the weight normally resting on the caster is relieved to lock the spindle against rotation.

3. A caster construction including a socket, a spindle rotatable therein, a caster carried by the spindle, and means operative when the weight normally resting on the caster is relieved to move the spindle into a predetermined position and to lock the spindle against rotation in that position.

4. A caster construction including a socket, a spindle rotatable therein, a caster carried by the spindle, and means to lock the spindle against rotation including a projection on the spindle, a recess in the socket, and means urging the projection into the recess.

5. A caster construction including a socket, a spindle rotatable therein, a caster carried by the spindle, and means to lock the spindle against rotation including a projection on the spindle, a recess in the socket, and spring means urging the projection into the recess.

6. A caster construction including a socket, a spindle rotatable therein, a caster carried by the spindle, and means to lock the spindle against rotation including a projection on the spindle, a recess in the socket, and means to guide the projection into the recess.

7. A caster construction including a socket, a spindle rotatable therein, a caster carried by the spindle, and means to lock the spindle against rotation including a projection on the spindle, a recess in the socket, and a cam surface in the socket for guiding the projection into the said recess.

8. A caster construction including a socket, a spindle rotatable therein, a caster carried by the spindle, and means to lock the spindle against rotation, said means including a bushing in the socket provided with a recess, and a locking pin on said spindle adapted to enter said recess.

9. A caster construction including a socket, a spindle rotatable therein, a caster carried by the spindle, and means to lock the spindle against rotation, said means including a bushing in the socket provided with a recess, and a locking pin on said spindle adapted to enter said recess, said bushing being provided with means to guide the pin into the recess.

10. A caster construction including a socket, a spindle rotatable therein, a caster carried by the spindle, and means to lock the spindle against rotation, said means including a bushing in the socket provided with a recess and a cam surface, and a locking pin on said spindle adapted to engage said cam surface and to be guided thereby into said recess.

11. A caster construction including a socket, a spindle rotatable therein, a caster carried by the spindle, and means to lock the spindle against rotation, said means including a bushing in the socket provided with a recess and a cam surface, a locking pin on said spindle adapted to engage said cam surface, and means urging the pin into the recess.

12. A caster construction including a support, a caster mounted to swivel on the support, and mechanism operative when the weight normally resting on the caster is relieved to lock the caster against swiveling.

13. A caster construction including a support, a caster mounted to swivel on the support, and mechanism operative when the weight normally resting on the caster is relieved to cause the caster to swivel until the same has assumed a predetermined position with respect to the support.

14. A caster construction including a support, a caster mounted to swivel on the support, and mechanism operative to cause the caster to assume a predetermined position with respect to the support and to lock the caster in that position.

15. A caster construction including a support, a caster mounted to swivel and move axially on the support, and means for urging the caster to swivel and move axially into a predetermined position with respect to the support.

In testimony whereof, I affix my signature.

MILTON C. HILL.